United States Patent
Noh et al.

(10) Patent No.: US 10,686,501 B2
(45) Date of Patent: Jun. 16, 2020

(54) PRECODING INFORMATION SIGNALING METHOD AND APPARATUS FOR UPLINK TRANSMISSION IN MOBILE COMMUNICATION SYSTEM USING A PLURALITY OF ARRAY ANTENNAS

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Heedon Gha, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/328,064

(22) PCT Filed: Aug. 23, 2017

(86) PCT No.: PCT/KR2017/009179
§ 371 (c)(1),
(2) Date: Feb. 25, 2019

(87) PCT Pub. No.: WO2018/038517
PCT Pub. Date: Mar. 1, 2018

(65) Prior Publication Data
US 2019/0199417 A1 Jun. 27, 2019

(30) Foreign Application Priority Data
Aug. 23, 2016 (KR) .................. 10-2016-0106917

(51) Int. Cl.
*H04B 7/0456* (2017.01)
*H04L 27/26* (2006.01)
(Continued)

(52) U.S. Cl.
CPC ......... *H04B 7/0456* (2013.01); *H04B 7/0478* (2013.01); *H04L 5/006* (2013.01);
(Continued)

(58) Field of Classification Search
CPC ........................... H04B 7/0456; H04B 7/0639
See application file for complete search history.

(56) References Cited

U.S. PATENT DOCUMENTS 9,065,719 B2 * 6/2015 Dietrich ............... H04B 7/0617
2009/0116434 A1 5/2009 Lohr et al.
(Continued)

FOREIGN PATENT DOCUMENTS

WO    WO 2011/016691    2/2011

OTHER PUBLICATIONS

PCT/ISA/210 Search Report issued on PCT/KR2017/009179 (pp. 7).
(Continued)

*Primary Examiner* — Kevin Kim
(74) *Attorney, Agent, or Firm* — The Farrell Law Firm, P.C.

(57) ABSTRACT

The present disclosure relates to a communication technique for converging IoT technology with a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. Disclosed are a method and an apparatus for configuring an efficient hierarchical layer 2 architecture and main functions thereof in a next-generation mobile communication system.

16 Claims, 14 Drawing Sheets

(51) Int. Cl.
*H04L 5/00* (2006.01)
*H04B 7/06* (2006.01)
*H04B 7/0404* (2017.01)
*H04W 72/04* (2009.01)
*H04B 7/024* (2017.01)
*H04W 4/70* (2018.01)
*H04L 1/18* (2006.01)
*H04W 84/04* (2009.01)

(52) U.S. Cl.
CPC .......... *H04L 5/0051* (2013.01); *H04L 5/0091* (2013.01); *H04L 27/26* (2013.01); *H04B 7/024* (2013.01); *H04B 7/0404* (2013.01); *H04B 7/065* (2013.01); *H04L 1/1812* (2013.01); *H04W 4/70* (2018.02); *H04W 72/046* (2013.01); *H04W 84/042* (2013.01)

(56) References Cited

U.S. PATENT DOCUMENTS

| | | | |
|---|---|---|---|
| 2010/0039928 A1* | 2/2010 | Noh | H04B 7/0617 370/210 |
| 2010/0208838 A1 | 8/2010 | Lee et al. | |
| 2011/0268204 A1* | 11/2011 | Choi | H04B 7/0639 375/260 |
| 2012/0127948 A1 | 5/2012 | Chung et al. | |
| 2013/0039319 A1 | 2/2013 | Shi et al. | |
| 2013/0322280 A1 | 12/2013 | Pi | |
| 2014/0362943 A1 | 12/2014 | Chen et al. | |
| 2016/0156401 A1 | 6/2016 | Onggosanusi et al. | |
| 2017/0134201 A1* | 5/2017 | Kim | H04B 17/336 |
| 2017/0257850 A1 | 9/2017 | Oh et al. | |

OTHER PUBLICATIONS

PCT/ISA/237 Written Opinion issued on PCT/KR2017/009179 (pp. 6).
Samsung, 3GPP TSG RAN WG1 Meeting #86, Gothenburg, Sweden Aug. 22-26, 2016, R1-166782, UL MIMO for NR, pp. 7.
European Search Report dated Jun. 12, 2019 issued in counterpart application 17843937.8-1220, 11 pages.

* cited by examiner

PRECODING INFORMATION SIGNALING METHOD AND APPARATUS FOR UPLINK TRANSMISSION IN MOBILE COMMUNICATION SYSTEM USING A PLURALITY OF ARRAY ANTENNAS

PRIORITY

This application is a National Phase Entry of PCT International Application No. PCT/KR2017/009179 which was filed on Aug. 23, 2017, and claims priority to Korean Patent Application No. 10-2016-0106917, which was filed on Aug. 23, 2016, the content of each of which is incorporated herein by reference.

TECHNICAL FIELD

Precoding information for use by a terminal in uplink transmission, which is determined by a base station as a receive end and transmitted to the terminal, may place a heavy burden on control channel capacity, especially when precoding is adopted per subband. The present invention relates to a per-subband precoding information signaling method for uplink transmission between the base station and the terminal that places no extra burden on control channel capacity.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FOAM) and sliding window superposition coding (SWSC) as advanced coding modulation (ACM) and filter bank multi carrier (FBMC), non-orthogonal multiple access (NOMA), and sparse code multiple access (SOMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged.

As technology elements, such as "sensing technology", "wired/wireless communication and network infrastructure", "service interface technology", and "security technology" have been demanded for IoT implementation, there has been recent research into a sensor network, Machine-to-Machine (M2M) communication, Machine Type Communication (MTC), and so forth.

Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In a wireless communication system such as the LTE/LTE-A system, a base station estimates an uplink channel based on a reference signal such as a sounding reference signal (SRS) transmitted by a terminal, determines precoding information and modulation and coding scheme (MCS) information, and transmits the determined information to the terminal. The terminal receives the precoding and MCS information via uplink (UL) downlink control information (DCI) and performs uplink transmission based on the received information. The UL DCI is restricted in capacity for certain reasons such as sufficient coverage acquisition, thereby preventing a large amount of information from being transmitted. In this respect, the legacy wireless communication systems support only wideband precoding based on single precoding information transmission.

However, wideband precoding is inferior in precoding accuracy to subband precoding, and the uplink transmission efficiency difference between wideband precoding and subband precoding increases in proportion to the number of transmit antennas of the terminal. In comparison with the current wireless communication system designed under the assumption of up to 4 transmit antennas per terminal, next generation wireless communication (e.g., 5G new radio (NR)) systems are likely to support 4 or more transmit antennas at the terminal by considering enhancement in antenna form factor and development of radio frequency (RF) technologies along with the employment of high frequency carriers. There is therefore a growing need to support uplink subband precoding in the NR communication systems.

DISCLOSURE OF INVENTION

Technical Problem

The present invention aims to provide 1) a method for a terminal to determine subband precoding information based on wideband precoding information transmitted by a base station and 2) a method for the terminal to receive the uplink precoding information on a data channel (xPUSCH) rather than on a control channel (xPUCCH).

Solution to Problem

In accordance with an aspect of the present invention, a method by a terminal in a wireless communication system includes receiving, from a base station, precoding-related information for uplink of the terminal; identifying whether uplink subband precoding is applicable based on the precoding-related information; and performing, uplink transmission based on specific subband precoding information, according to the uplink subband precoding being identified to be applicable.

In accordance with another aspect of the present invention, a method by a base station in a wireless communication system includes identifying whether to allow uplink subband precoding of a terminal based on a channel status of uplink of the terminal, transmitting, to the terminal, precoding-related information including a result of the identification, and receiving, from the terminal, uplink resources based on the transmission of the precoding-related information.

In accordance with another aspect of the present invention, a terminal in a wireless communication system includes a transceiver, and a controller configured to control the transceiver to receive, from a base station, precoding-related information for uplink of the terminal, identify whether uplink subband precoding is applicable based on the precoding-related information, and control the transceiver to perform uplink transmission based on specific subband precoding information, according to the uplink subband precoding being identified to be applicable.

In accordance with still another aspect of the present invention, a base station in a wireless communication system includes a transceiver, and a controller configured to identify whether to allow uplink subband precoding of a terminal based on a channel status of uplink of the terminal, control the transceiver to transmit, to the terminal, precoding-related information including a result of the identification, and control the transceiver to receive, from the terminal, uplink resources based on the transmission of the precoding-related information.

Advantageous Effects of Invention

The uplink precoding information signaling method and operations of the base station and terminal that are proposed in the present invention are advantageous in terms of determining uplink precoding information efficiently and allowing subband precoding for uplink transmission efficiency enhancement with no extra control channel burden.

MODE FOR THE INVENTION

Figure 1:
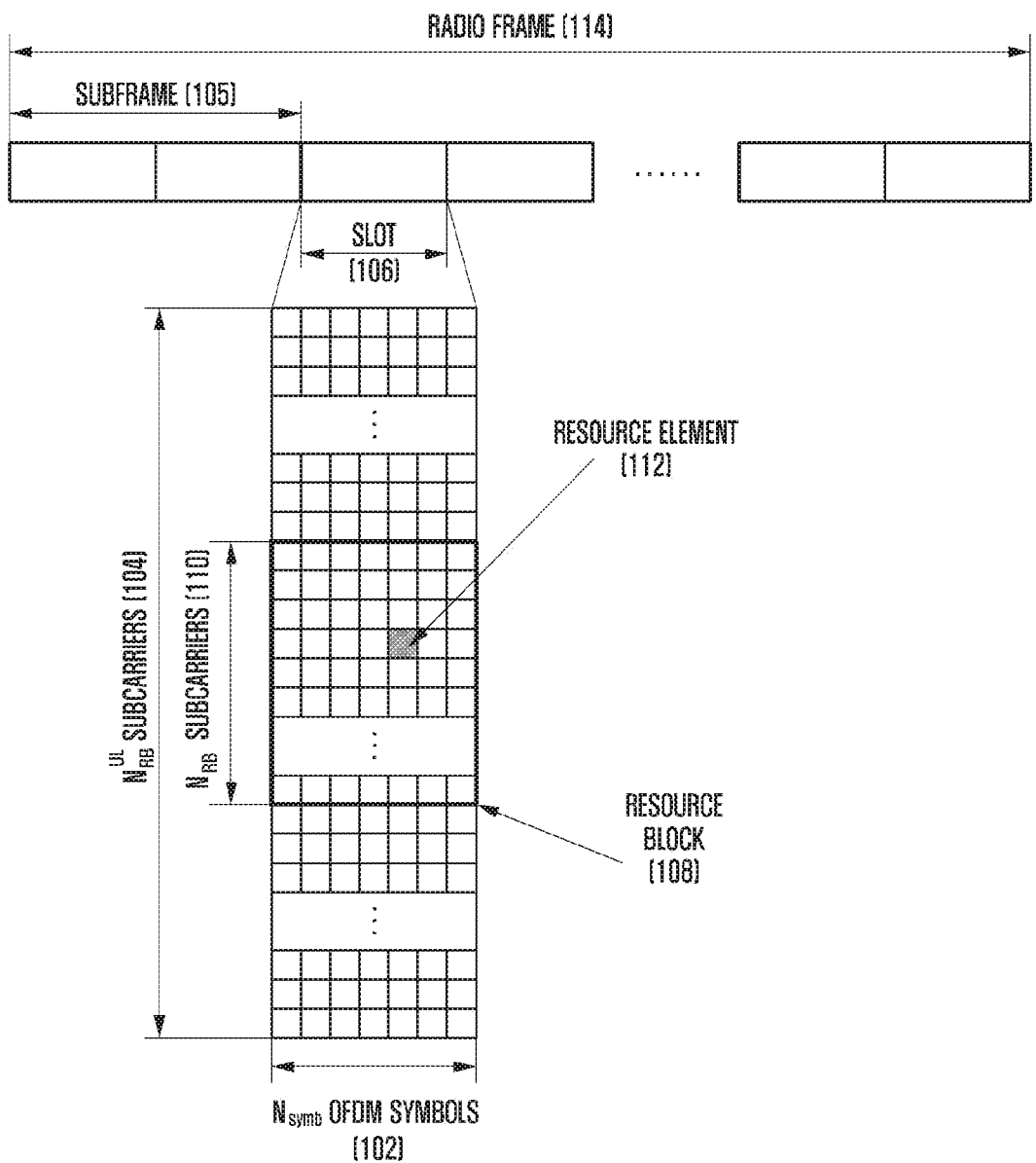
FIG. 1 is a diagram illustrating a time-frequency resource structure for downlink transmission in a legacy LTE or LTE-A system.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in the 3$^{rd}$ Generation Partnership Project (3GPP), High Rate Packet Data (HRPD) defined in the 3$^{rd}$ Generation Partnership Project-2 (3GPP2), and 802.16e defined in the IEEE) capable of providing data and multimedia services beyond the early voice-oriented services. Meanwhile, 5G or NR standardization is in progress for 5G wireless communication systems.

As one of the representative broadband wireless communication systems, the LTE system employs orthogonal frequency division multiplexing (OFDM) in the downlink (DL) and single carrier frequency division multiple access (SC-FDMA) in the uplink UL).

The term "uplink" denotes a radio transmission path from a terminal (or UE or MS) to a BS (gNB), and the term downlink denotes a radio transmission path from the BS to the terminal. Such multiple access schemes are characterized by allocating the time-frequency resources for transmitting user-specific data and control information without overlap with each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. An HARQ scheme is designed to operate in such a way that a receiver, when it fails in decoding data, sends a transmitter a negative acknowledgement (NACK) indicative of the decoding failure in order for the transmitter to retransmit the corresponding data on the physical layer.

The receiver combines the retransmitted data with the decoding-failed data to improve data reception performance. The HARQ scheme may also be designed to operate in such a way that the receiver, when it succeeds in decoding data, sends the transmitter an Acknowledgement (ACK) indicative of successful decoding in order for the transmitter to transmit new data.

FIG. 1 is a diagram illustrating a basic time-frequency resource structure for transmitting downlink data or control channel in an LTE system.

In FIG. 1, the horizontal axis denotes the time, and the vertical axis denotes the frequency. The smallest transmission unit in the time domain is an OFDM symbol, and $N_{symb}$ OFDM symbols 102 forms a slot 106, and 2 slots forms a subframe 105. Each slot spans 0.5 ms, and each subframe spans 1.0 ms.

A radio frame 114 is a time unit consisted of 10 subframes. In the frequency domain, the smallest transmission unit is a subcarrier, and the total system transmission bandwidth consists of $N_{BW}$ subcarriers 104.

In the time-frequency resource structure, the basic resource unit is a Resource Element (RE) indicated by an OFDM symbol index and a subcarrier index. A Resource Block (RB) (or Physical Resource Block (PRB)) 108 is defined by $N_{symb}$ consecutive OFDM symbols 102 in the time domain and $N_{RB}$ consecutive subcarriers 110 in the frequency domain.

That is, one RB 108 consists of $N_{symb} \times N_{RB}$ REs 112. Typically, the RB is the smallest data transmission unit. In the LTE system, $N_{symb}=7$, $N_{RB}=12$, and $N_{BW}$ and $N_{RB}$ are proportional to the system transmission bandwidth. The data rate increases in proportion to the number of RBs scheduled for the terminal. For the LTE system, 6 different transmission bandwidths are defined. In the case of a frequency division duplex (FDD) system in which downlink and uplink are separated in frequency, the downlink and uplink transmission bandwidths may differ in bandwidth.

The channel bandwidth denotes an RF bandwidth in comparison with the system transmission bandwidth. Table 1 shows the relationship between the system transmission bandwidth and channel bandwidths defined in the LTE standard. For example, an LTE system may have a 10 MHz channel bandwidth that consists of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal via downlink control information (DCI). The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. A Type 0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type 0 scheme. A Type 1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block (TB) to be transmitted.

HARQ process number: HARQ process number indicates a process number of HARQ.

New data indicator: New data indicator indicates whether the HARQ transmission is an initial transmission or a retransmission.

Redundancy version (RV): Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH, which is interchangeably referred to as control information hereinafter) or Enhanced PDCCH (EPDCCH, which is interchangeably referred as enhanced control information hereinafter) after undergoing a channel coding and modulation process.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM; and they have modulation orders ($Q_m$) 2, 4, and 6, respectively. That is, the QPSK modulation transmits 2 bits per symbol, the 16QAM transmits 4 bits per symbol, and the 64QAM transmits 6 bits per symbol.

Figure 2:
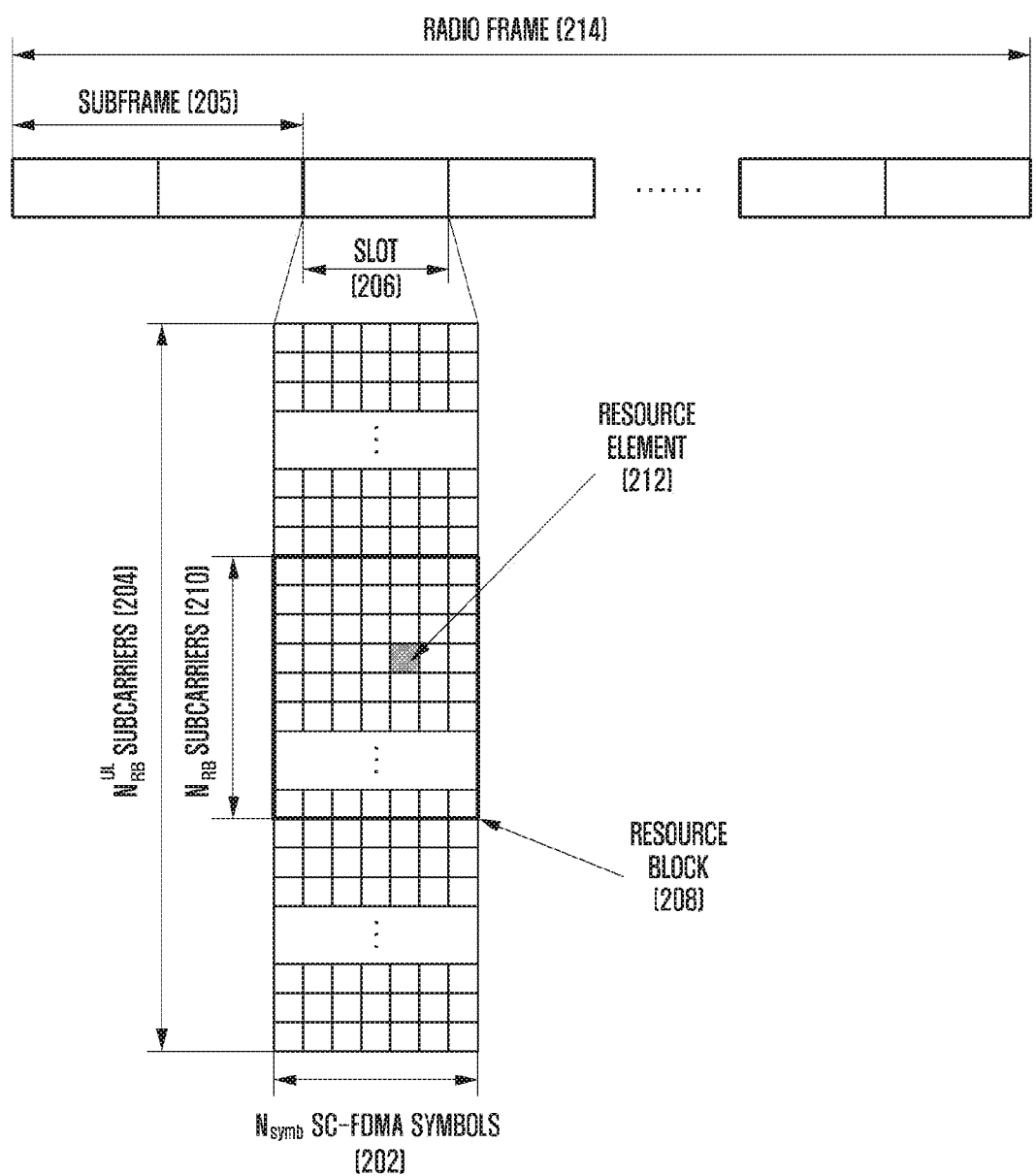
FIG. 2 is a diagram illustrating a time-frequency resource structure for uplink transmission in a legacy LTE or LTE-A system.

FIG. 2 is a diagram illustrating a basic time-frequency resource structure for transmitting uplink data or control channels in an LTE-A system.

In FIG. 2, the horizontal axis denotes the time, and the vertical axis denotes the frequency. The smallest transmission unit in the time domain is SC-FDMA symbol, and, $N_{symb}^{UL}$ SC-FDMA symbols 202 form a slot 206. Two slots form a subframe 205. The smallest transmission unit in the frequency domain is a subcarrier, and the system transmission bandwidth consists of total $N_{BW}$ subcarriers 204. $N_{BW}$ is proportional to the system transmission bandwidth.

In the time-frequency domain, the basic resource unit is RE 212, and each RE is defined by one SC-FDMA symbol index and one subcarrier index. An RB or PRO 208 is defined by $N_{symb}^{UL}$ consecutive SC-FDMA symbols in the time domain and $N_{sc}^{RB}$ consecutive subcarriers in the frequency domain. Accordingly, one RB consists of $N_{symb}^{UL} \times N_{sc}^{RB}$ REs. Typically, the smallest data or control information transmission unit is an RB. A physical uplink control channel (PUCCH) is mapped to a frequency region corresponding to one RB and transmitted during a time period of one subframe.

The LTE standard defines a relationship between the PDSCH or the PDCCH/EPDCCH carrying a semi-persistent scheduling (SPS) release and the PUCCH or physical uplink shared channel (PUSCH) carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n^{th}$ subframe, it transmits UL control information including the HARQ ACK/NACK corresponding to the DL data to the eNB through the PUCCH or PUSCH at the $(n+k)^{th}$ subframe. Here, k is determined differently depending on the duplex mode (i.e., FDD or time division duplex (TDD)) and subframe configuration in use by the LTE system. For example, k is fixed to 4 in the FDD LTE system; whereas, k may vary according to the subframe configuration and subframe index in the TDD LTE system.

The LTE system employs a synchronous HARQ scheme with a fixed data transmission timing for UL transmission distinct from the DL HARQ. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receive a PDCCH carrying UL scheduling control information or a PHICH carrying a DL HARQ ACK/NACK from the eNB at the $n^{th}$ subframe, it transmits UL data through a PUSCH at the $(n+k)^{th}$ subframe based on the control information. Here, k is determined differently depending on the duplex mode in use, i.e., FDD or TDD, and its configuration. For example, k is fixed to 4 in the FDD LTE system; whereas, k is variable according to the subframe configuration and subframe index in the TDD LTE system The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode (i.e., FDD or TDD) and its configuration in use by the LTE system. For example, k is fixed to 4 in the FDD LTE system; whereas, k is variable according to the subframe configuration and subframe index in the TDD LTE system.

Although the above-description is directed to the LTE system, the proposed method of the present invention is applicable to various radio communication systems including 5G NR.

Figure 3:
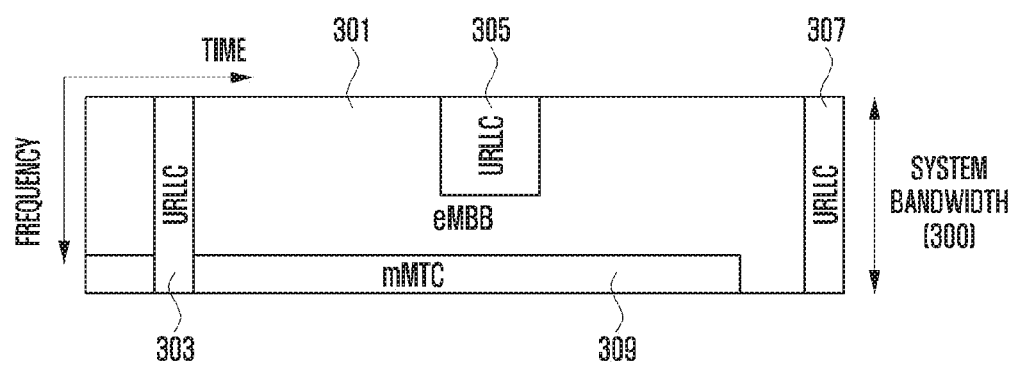
FIG. 3 is a diagram illustrating an exemplary time-frequency resource region to which various slices for eMBB, URLLC, and mMTC are mapped.
Figure 4:
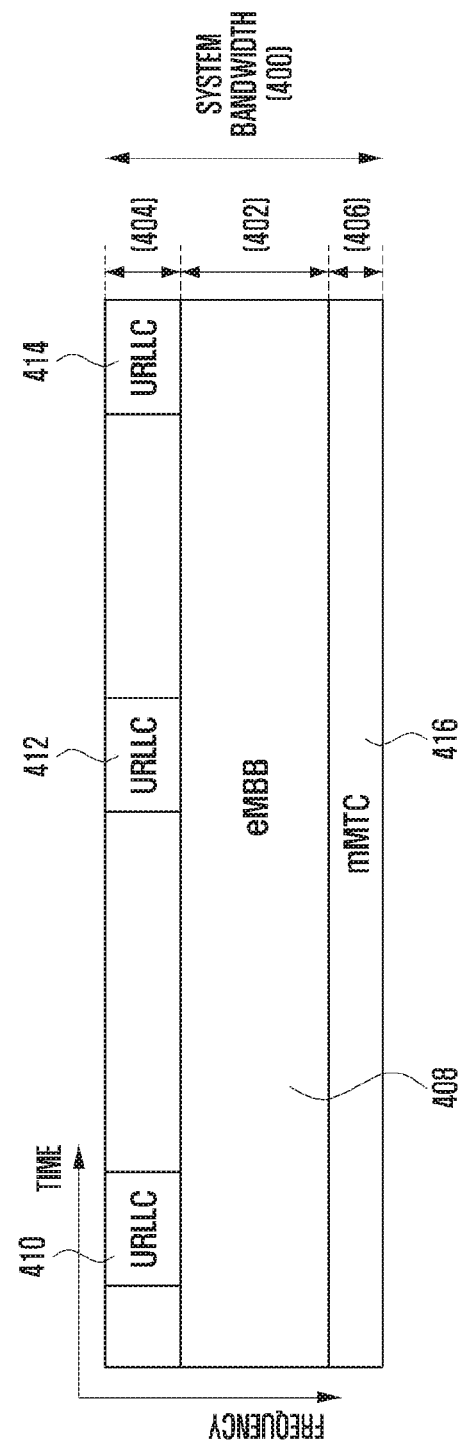
FIG. 4 is a diagram illustrating another exemplary time-frequency resource region to which various slices for eMBB, URLLC, and mMTC are mapped.
Figure 5:
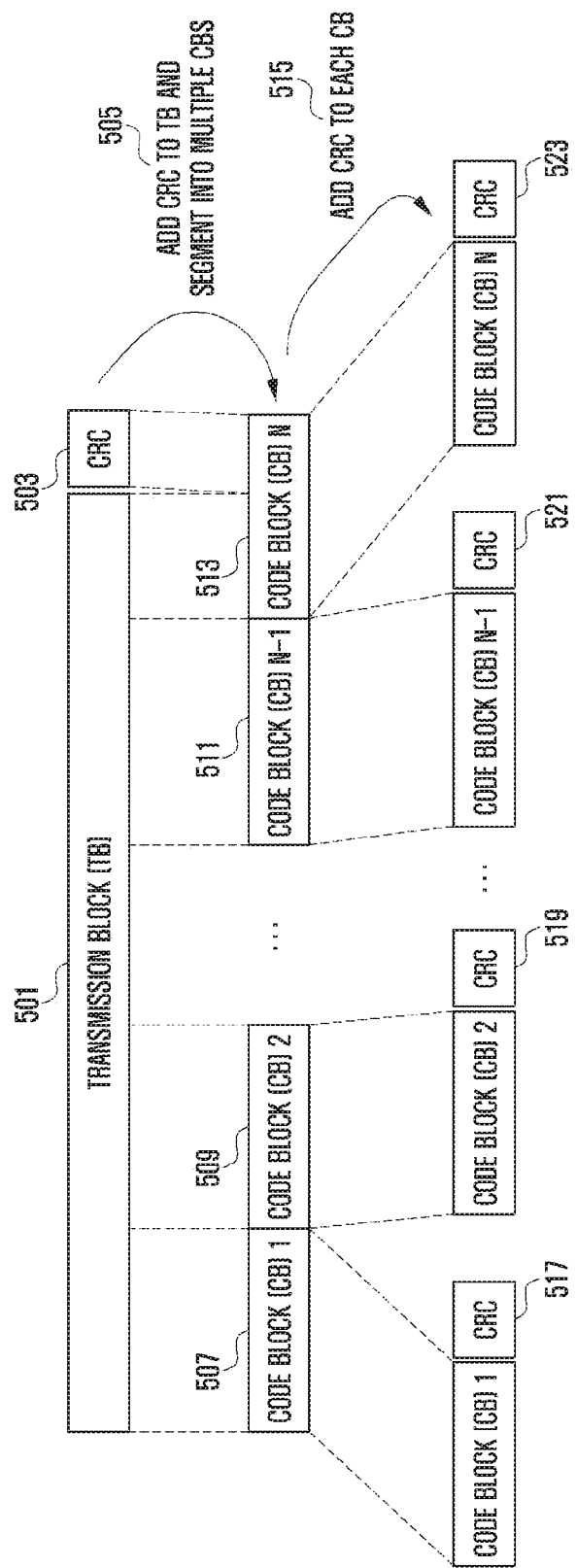
FIG. 5 is a diagram illustrating an exemplary code block segmentation in a legacy LTE or LTE-A system.
Figure 6:
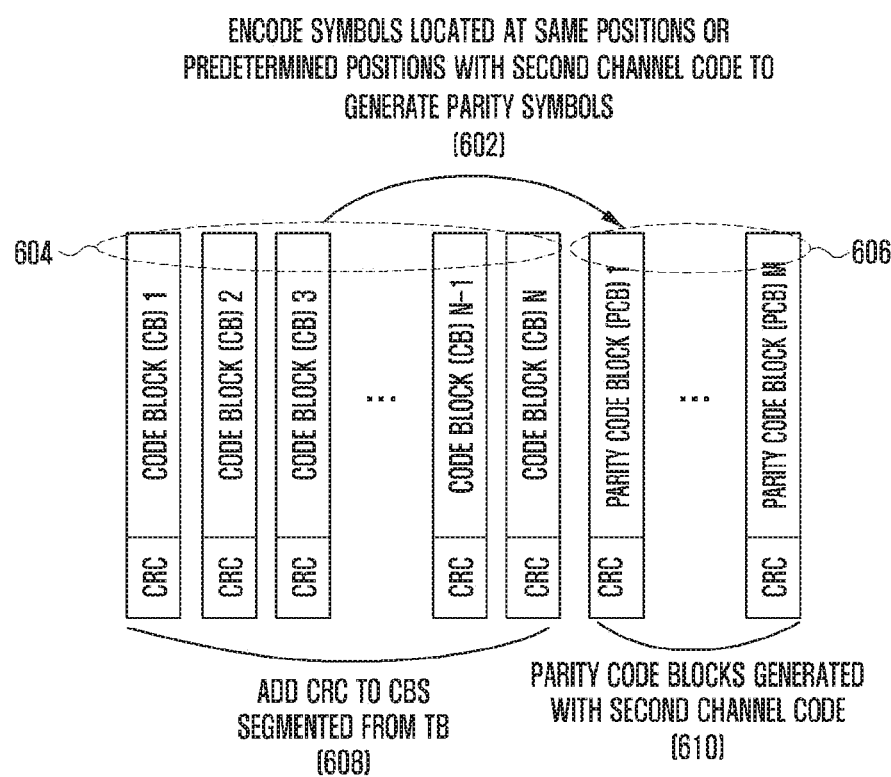
FIG. 6 is a diagram illustrating an exemplary outer code for use in NR.

FIGS. 3 and 4 show that data of enhanced mobile broadband (eMBB), ultra-reliable low-latency communication (URLLC), and massive machine type communication (mMTC) services considered to be supported in the 5G NR system are mapped to frequency-time resources.

In FIG. 3, the eMBB, URLLC, and mMTC data are mapped across the whole system frequency band 300. In the case where it becomes necessary to transmit URLLC data in the course of the transmission of the eMBB and mMTC data in predetermined frequency bands as denoted by reference number 301 and 309, parts of the ongoing transmissions of the eMBB and mMTC service data are punctured and then allocated for the URLLC data as denoted by reference numbers 303, 305, and 307.

Among the aforementioned types of services, the URLLC, which is latency critical, may be allocated part of the resources in use for the eMBB service as denoted by reference numbers 303, 305, and 307. If the URLLC data are transmitted on the resources allocated for the eMBB service, this means that the eMBB data that should be transmitted on the part resources are not transmitted, resulting in reduction of transmission throughput of the eMBB data. In this case, the resource allocation for URLLC data transmission may cause eMBB data transmission failure.

As shown in FIG. 4, the whole system frequency band 400 may be divided into subbands 402, 404, and 406 for service-specific data transmissions. The subbands may be pre-divided and notified to the terminals via higher layer signaling, or the base station may make the sub-division arbitrarily and provide the terminals with the services without any provision of subband information.

In FIG. 4, the subbands 402, 404, and 406 are designated, by way of example, for eMBB, URLLC, and mMTC data transmissions, respectively. In FIGS. 3 and 4, a transmission time interval (TTI) for the URLLC transmission may be shorter than the TTI for the eMBB and mMTC transmissions.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. The term "downlink (DL)" denotes a radio transmission path from a base station to a terminal, and the terminal "uplink (UL)" denotes a radio transmission path from the terminal to the base station.

Although the description is directed to an LTE or LTE-A system by way of example, the present invention is applicable to other communication systems having a similar technical background and channel format. For example, the present invention is applicable to the 5G mobile communication technology (5G new radio (NR)) under development after LTE-A. It will be understood by those skilled in the art that the present invention can be applied even to other communication systems with a slight modification without departing from the spirit and scope of the present invention.

In the following description, the eMBB service is referred to as first-type service, and eMBB service data is referred to as first-type data. The first-type service and the first-type data are characterized by high data rate and broadband transmission requirements. The URLLC service is referred to as second-type service, and URLLC service data is referred to as second-type data.

The second-type service and the second-type data are characterized by low latency and high reliability requirements. The mMTC service is referred to as third-type service, and mMTC service data is referred to as third-type data. The third-type service and the third-type data are characterized by low data rate, high coverage, and low power requirements.

The three types of services or data may differ in physical layer channel structure. For example, they may differ in TTI length, unit of frequency resource allocation, control channel structure, and data mapping scheme.

Although the description is made with three types of services and three types of data, the present invention is applicable to other cases where more types of services and corresponding service data exist.

The methods and apparatus proposed in the present invention may be described with the terms "physical channel" and "signal" in use for legacy LTE and LTE-A systems. However, the present invention may also be applied to other wireless communication systems other than the LTE and LTE-A systems.

The present invention defines the operations of the terminal and base station for transmitting the aforementioned first-type, second-type, and third-type services or data and proposes a method for serving the terminals scheduled for receiving the different types of services or data together in a system. In the present invention, first-type, second-type, and third-type terminals are the terminals scheduled for receiving the first-type, second-type, and third-type services or data, respectively.

The proposed method of the present invention may be applicable to both the FDD and TDD systems.

In the following description, the term "physical layer signaling" is intended to mean a scheme for transmitting a signal from a base station to a terminal using a physical layer downlink control channel and from the terminal to the base station using a physical layer uplink control channel, and it may also be interchangeably referred to as L1 signaling and PHY signaling.

In the following description, the terms "high-level signaling" and "higher layer signaling" are intended to mean a scheme for transmitting a signal from a base station to a terminal using a physical layer downlink data channel and from the terminal to the base station using a physical layer uplink data channel, and they may also be interchangeably referred to as radio resource control (RRC) signaling, L2 signaling, packet data convergence protocol (PDCP) signaling, and medium access control (MAC) control element (MAC CE).

In the following description, the term "TPMI" stands for transmit precoding matrix indicator or transmit precoding matrix information and may also be referred to as beamforming vector information and beam direction information.

In the following description, the terms "UL DCI" and "UL-related DCI" are intended to mean the physical control (L1 control) signaling conveying information necessary for an uplink transmission such as a UL grant including UL resource configuration information and resource configuration type information, UL power control information, UL cyclic shift or orthogonal cover code (OCC), channel state information (CSI) request, SRS request, codeword-specific MCS information, and UL precoding information field.

In the present invention, it is assumed that dynamic beamforming or semi-dynamic beamforming is supported for supporting uplink transmission in various scenarios.

Figure 7:
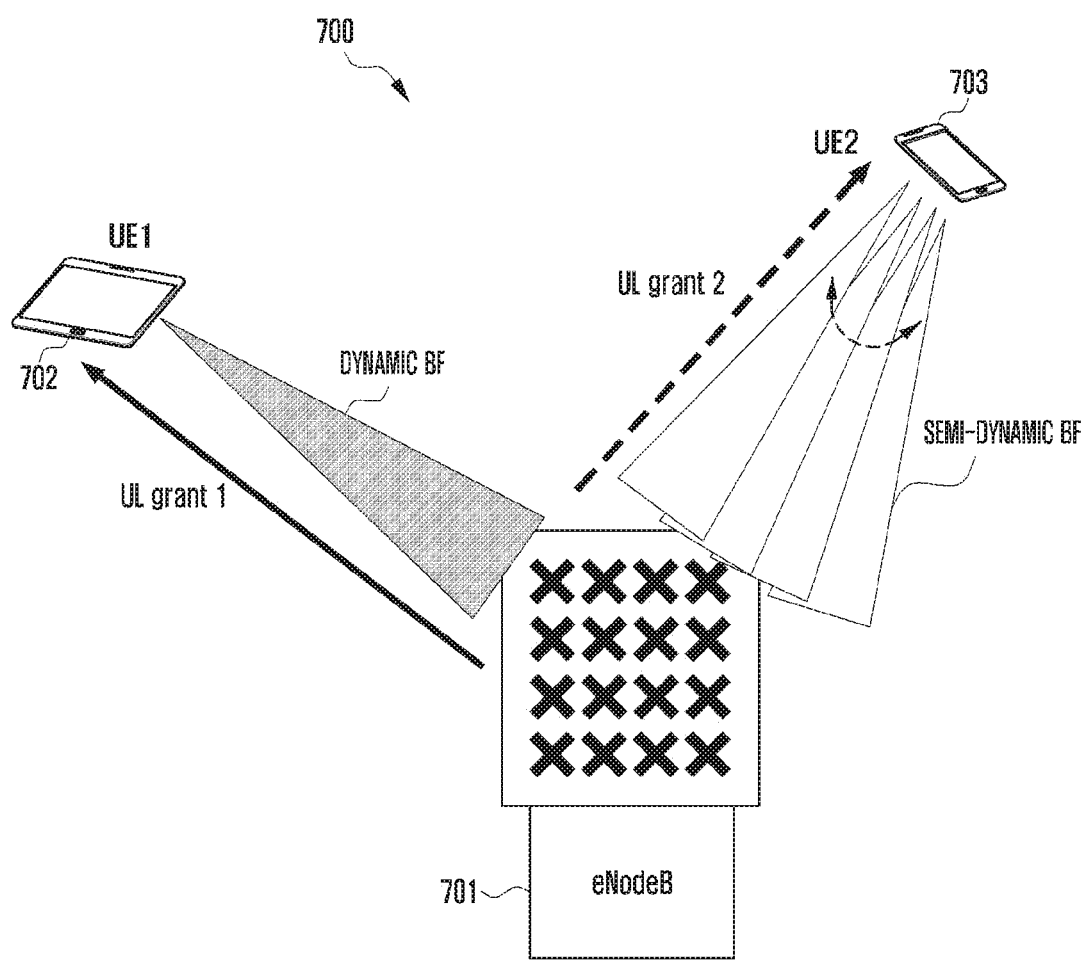
FIG. 7 is a diagram illustrating exemplary dynamic beamforming-based UL transmission and semi-dynamic beamforming-based UL transmission.

FIG. 7 is a diagram illustrating exemplary dynamic beamforming-based UL transmission and semi-dynamic beamforming-based UL transmission.

The dynamic beamforming is appropriate for a situation where UL channel information is accurate, e.g., a situation where the UE has a low mobility, cells are well-separated, and inter-cell interference is well-managed. In this case, the UE 702 may perform UL transmission with a beam formed to have a narrow beamwidth based on accurate UL channel direction information.

The base station 701 transmits a TPMI to the UE via a UL DCI such as UL grant. After the receipt of the TPMI, the UE transmits UL data to the base station using a precoder or a beamforming vector/matrix indicated by the TPMI. A codebook-based MIMO transmission for supporting the dynamic beamforming may be used with the UL DCI including a precoding matrix information (PMI) field, the UL DCI being determined, if a rank indicator (RI) is present, based on the RI.

Here, the PMI field indicates the precoding matrix for use by the UE in UL transmission. The precoding matrix conveyed in the wideband precoding information may be configured to steer the direction of transmission for the whole allocated band, and the precoding matrix conveyed in the narrowband precoding information may be configured to steer the direction of the transmission per subband. It may be possible to restrict the precoding vector designated by the subband precoding information to be included in a precoding vector group designated by the wideband precoding information. This may reduce subband precoding information signaling overhead.

The semi-dynamic beamforming is appropriate for a situation where UL channel information is inaccurate, e.g., a situation where the UE has a high mobility, cells are ill-separated, and inter-cell interference is ill-managed. In this case, the UE 703 may perform UL transmission using a beam group including beams oriented in distinct directions based on appropriate UL channel direction information.

The base station 701 transmits a TPMI to the UE via UL DCI such as UL grant. After the receipt of the TPMI, the UE transmits UL data to the base station using a subset of the precoder or beamforming vector/matrix indicated by the TPMI.

A codebook-based MIMO transmission for supporting the semi-dynamic beamforming may be used with the UL DCI including a precoding matrix information (PMI) field, the UL DCI being determined, if a rank indicator (RI) is present, based on the RI. Here, the PMI field indicates a precoding vector group for use by the UE in UL transmission. The precoding vector group information may be commonly used in the whole UL band allocated via the wideband information. It may be possible for the UE to apply precoder cycling to the beams belonging to the precoding vector group according to a predetermined pattern.

The precoding vector group or beam group may be defined in two ways as follows:

The first is to define the beam groups based on hierarchical PMI. For example, a PMI mapped to a code point may consist of two or more sub-PMIs. Assuming that the PMI consists of two sub-PMIs, it may be pre-agreed that the first and second sub-PMIS are used as indices indicating respectively one of beam groups that each include a predetermined number of precoding vectors and one of the precoding vectors included in the selected beam group.

For example, a UL codebook composed of beam groups $G_i$ including each B discrete Fourier transform (DFT) precoding vectors $v_k$ based on M transmit antennas of the UE and the oversampling factor O may be defined as Equation 1.

$$v_k = \frac{1}{\sqrt{M}} \times [1 \ e^{j\frac{2\pi k}{OM}} \ e^{j\frac{4\pi k}{OM}} \ \ldots \ e^{j\frac{2\pi(m-1)k}{OM}}]^T \quad \text{[Equation 1]}$$

$$G_i = [v_i \ v_{mod(i+1,OM)} \ \ldots \ v_{mod(i+B-2,OM)} \ v_{mod(i+B-1,OM)}]$$

Here, A denotes beam group spacing (in unit of beam) as a beam skipping factor. In this embodiment, the first PMI i denotes a beam group index, and it may be possible to indicate a precoding vector using the second PMI with the payload of $\lceil \log_2 B \rceil$.

The second is to define a beam/beam group based on a PMI with a single structure. For example, one PMI may be understood as an indicator indicating a beam or a beam group based on the information being transmitted via higher layer signaling or physical layer signaling. For example, a UL codebook composed of beam groups $G_i$ including each B discrete Fourier transform (DFT) precoding vectors $v_k$ based on M transmit antennas of the UE and the oversampling factor O may be defined as Equation 2.

$$v_i = \frac{1}{\sqrt{M}} \times [1 \ e^{j\frac{2\pi i}{OM}} \ e^{j\frac{4\pi i}{OM}} \ \ldots \ e^{j\frac{2\pi(M-1)i}{OM}}]^T \quad \text{[Equation 2]}$$

$$G_i = [v_i \ v_{mod(i+1,OM)} \ \ldots \ v_{mod(i+B-2,OM)} \ v_{mod(i+b-1,OM)}]$$

In this embodiment, if the dynamic beamforming or wideband precoding is indicated via higher layer or physical layer signaling, it may be understood that the $i^{th}$ PMI indicates $v_i$. Meanwhile, if the semi-dynamic beamforming or subband precoding is indicated via higher layer or physical layer signaling, it may be understood that the $i^{th}$ PMI indicate $G_i$.

Table 1A shows how to interpret TPMI when dynamic or semi-dynamic beamforming transmission or wideband or subband precoding is indicated via higher layer signaling in this embodiment. Table 1B shows how to interpret TPMI when dynamic or semi-dynamic beamforming transmission or wideband or subband precoding is indicated via physical layer signaling in this embodiment.

TABLE 1A

Exemplary PMI table for embodiment 1

| | Precoder or precoder group | |
|---|---|---|
| PMI value i | BeamformingScheme = 'Dynamic' | BeamformingScheme = 'Semi-dynamic' |
| 0 | $v_0$ | $G_0$ |
| 1 | $v_1$ | $G_1$ |
| 2 | $v_2$ | $G_2$ |
| ... | ... | ... |
| OM − 1 | $v_{OM-1}$ | $G_{OM-1}$ |

TABLE 1B

Exemplary PMI table for embodiment 2 (2nd example)

| | Interpretation | |
|---|---|---|
| PMI value i | Beamforming scheme | Precoder or precoder group |
| 0 | Dynamic | Precoder $v_0$ |
| 1 | Dynamic | Precoder $v_1$ |
| 2 | Dynamic | Precoder $v_2$ |
| ... | ... | ... |
| OM − 1 | Dynamic | Precoder $v_{OM-1}$ |
| OM | Semi-dynamic | Precoder group $G_0$ |
| OM + 1 | Semi-dynamic | Precoder group $G_1$ |
| OM + 2 | Semi-dynamic | Precoder group $G_2$ |
| ... | ... | ... |
| 2OM − 1 | Semi-dynamic | Precoder group $G_{OM-1}$ |

Although it is assumed in Equations 1 and 2 that a codebook of 1-dimensional DFT vectors is used for the case where transmit antennas of the UE are arranged in a 1-dimensional layout, it may be possible to use a UL codebook in a different format for the case where the transmit antennas of the UE are arranged in a 2-dimensional layout.

For example, if the transmit antenna array of the UE includes M1 antenna ports in a first dimension and M2 antenna ports in a second dimension, it is possible to define a precoding vector $v_{m_1,m_2}$ and a beam group $G_{m_1,m_2}$ using a pair of indexes (m1 m1) as shown in Equation 3.

$$v_{m_1,m_2} = \frac{1}{\sqrt{M_1 M_2}} \times \begin{bmatrix} 1 & e^{j\frac{2\pi m_1}{O_1 M_1}} & e^{j\frac{4\pi m_1}{O_1 M_1}} & \cdots & e^{j\frac{2\pi(M_1-1)m_1}{O_1 M_1}} \end{bmatrix}^T \otimes \quad \text{[Equation 3]}$$

$$\begin{bmatrix} 1 & e^{j\frac{2\pi m_2}{O_2 M_2}} & e^{j\frac{4\pi m_2}{O_2 M_2}} & \cdots & e^{j\frac{2\pi(M_2-1)m_2}{O_2 M_2}} \end{bmatrix}^T$$

$$= v_{m_1} \otimes v_{m_2}$$

$$G_{m_1,m_2} = G_{m_1} \otimes G_{m_2}$$

$$G_{m_i} = [v_{m_i} \ v_{mod(m_i+1,O_iM_i)} \ \cdots \ v_{mod(m_i+B_i-2,O_iM_i)}$$
$$v_{mod(m_i+B_i-1,O_iM_i)}]$$

Although it is assumed in Equations 1, 2, and 3 that the transmit antennas of the UE have the same polarity, the exemplary UL codebooks may be modified, if the transmit antennas of the UE are dual-polarized, in consideration of the dual-polarization.

For example, if the transmit antennas of the UE are 1-dimensionally arranged so as to have a total of 2M antenna ports (M antenna ports per polarity), it may be possible to define a rank 1 precoding vector $v_{i,k}$ and beam group $G_m$ as shown in Equation 4.

$$v_{i,k} = \frac{1}{\sqrt{2M}} \times \begin{bmatrix} d_i \\ \phi_k d_i \end{bmatrix} \quad \text{[Equation 4]}$$

$$d_i = \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T, \phi_k = e^{j2\pi k/K}$$

$$G_m = [v_m \ v_{mod(m+1,OM)} \ \cdots \ v_{mod(m+B-2,OM)} \ v_{mod(m+B-1,OM)}],$$

$$m = (K-1)i + k$$

In Equation 4, K denotes a co-phasing quantization level.

In another exemplary case where the transmit antennas of the UE are 2-dimensionally arranged to have a total of 2 M1M2 antenna ports (M1M2 antenna ports per polarity), it may be possible to define a rank 1 precoding vector $v_{m_1,m_2,k}$ as shown in Equation 5. Here, M1 and M2 are the number of transmit antenna ports of the UE for the respective polarities corresponding to the first and second dimensions. The beam group may be configured based on $v_{m_1,m_2,k}$ of Equation 5 in a similar way to that of Equation 3.

$$v_{m_1,m_2,k} = \frac{1}{\sqrt{2M_1 M_2}} \times \begin{bmatrix} d_{m_1} \otimes d_{m_2} \\ e^{\phi_k} d_{m_1} \otimes d_{m_2} \end{bmatrix} \quad \text{[Equation 5]}$$

$$d_{m_1} = \begin{bmatrix} 1 & e^{j\frac{2\pi m_1}{O_1 M_1}} & e^{j\frac{4\pi m_1}{O_1 M_1}} & \cdots & e^{j\frac{2\pi(M_1-1)m_1}{O_1 M_1}} \end{bmatrix}^T$$

$$d_{m_2} = \begin{bmatrix} 1 & e^{j\frac{2\pi m_2}{O_2 M_2}} & e^{j\frac{4\pi m_2}{O_2 M_2}} & \cdots & e^{j\frac{2\pi(M_2-1)m_2}{O_2 M_2}} \end{bmatrix}^T$$

It is obvious that the exemplary dynamic/semi-dynamic beamforming or wideband/subband precoding signaling, i.e., Tables 1A and 1B, is applicable to all of the above-exemplified codebooks.

Although the description has been made based on the rank 1 codebook indicative of a single direction, the present invention is not limited thereto, and in real implementation it may be applicable to the case of using a codebook of rank 2 or higher that is indicative of two or more directions.

In the above exemplary cases assuming the UL DCI including one TPMI, it is possible for the UE to apply, upon receipt of the UL DCI, the UL precoding for a beam direction or a beam group. Here, applying precoding means applying a matrix indicated by a specific precoding index, the matrix being included in a set of precoding matrices.

Figure 8:
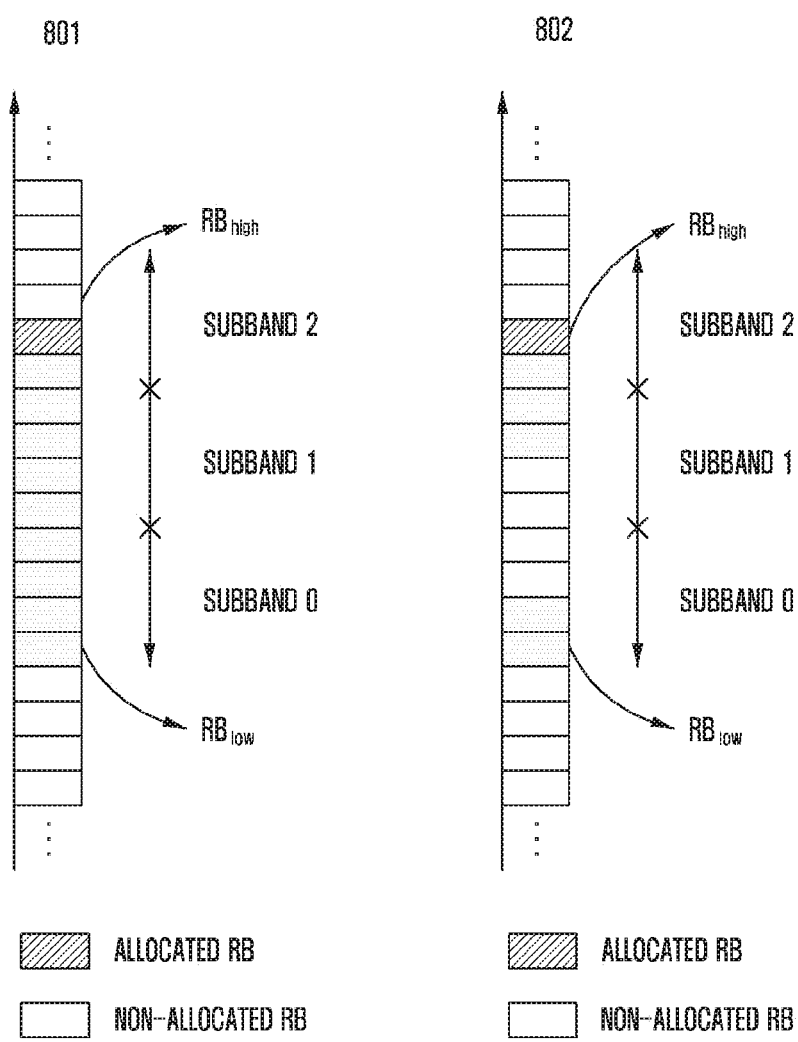
FIG. 8 is a diagram illustrating exemplary resource allocation and subband precoding for uplink transmission.

FIG. 8 is a diagram illustrating an exemplary resource allocation and subband precoding for uplink transmission.

For example, it may be possible for the base station to transmit the UL DCI including $N_{PMI}$ TPMIs conveying precoding information about multiple, e.g., NPMI, subbands for subband precoding. Here, $N_{PMI}$ is determined by $RA_{RB}$ indicative of a number of UL resources (RBs) allocated to the UE, $P_{SUBBAND}$ indicative of a number of RBs constituting a subband, and a UL resource allocation scheme.

FIG. 8 depicts UL resources for the case of allocating continuous RBs as denoted by reference number 801 and UL resources for the case of allocating discontinuous (clustered) RBs as denoted by reference number 802. In FIG. 8, $P_{SUBBAND}=4$ is assumed. In FIG. 8, the resources are allocated as denoted by reference number 801, i.e., in a clustered manner, and a number of necessary subbands may be calculated by Equation 6 with $RA_{RB}$ and $P_{SUBBAND}$.

$$N_{PMI} = \left\lceil \frac{RA_{RB}}{P_{SUBBAND}} \right\rceil \quad \text{[Equation 6]}$$

In the case of allocating resources including one or more clusters as denoted by reference number 802, $N_{PMI}$ may be calculated by Equation 7 or 8 rather than by Equation 6, which is likely to be incorrect in this case.

Equation 7 is a method for calculating $N_{PMI}$ based on $RB_{low}$ indicative of the lowest of the indices of the allocated RBs and $RB_{high}$ indicative of the highest of the indices of the allocated RBs. Equation 8 is a method for calculating NPR based on the number of continuously allocated RBs per cluster. In Equation 8, $RA_{RB,n}$ denotes a number of continuously allocated RBs in the $n^{th}$ cluster, and N denotes a number of clusters allocated to the UE.

$$N_{PMI} = \left\lceil \frac{RB_{high} - RB_{low} + 1}{P_{SUBBAND}} \right\rceil \quad \text{[Equation 7]}$$

$$N_{PMI} = \left\lceil \frac{RA_{RB,1}}{P_{SUBBAND}} \right\rceil + \cdots + \left\lceil \frac{RA_{RB,N}}{P_{SUBBAND}} \right\rceil \quad \text{[Equation 8]}$$

If the UL PMI has an length of T bits, it may be necessary to transmit a TPMI payload of $N_{PMI}$ bits for UL subband precoding in this exemplary case. This means that a few dozen of bits may be necessary for TPMI signaling for the case of using a few subbands and a few bits of codebook. This may cause significant UL DCI transmission overhead; thus, there is a need of a novel UL subband precoding method for reducing the UL DCI transmission overhead.

Embodiment 1

According to embodiment 1, a UE may make a precoding decision in part so as to reduce overhead of TMPI signaling for UL subband precoding. For this purpose, the base station may transmit to the UE an indicator indicating whether the UE is allowed to make an uplink precoding decision via physical layer or higher layer signaling.

In an exemplary implementation of this embodiment, the base station may notify the UE of the purpose per reference signal using a second indicator being triggered based on a first indicator (indicating whether the UE is allowed to make a UL precoding decision). For example, a reference signal may be used for the purpose of determining whether a representative link is a desired link or an interfering link, and this may be understood as considering the receiver types of transmission and reception points (TRPs) transmitting their own reference signals. The second indicator may be omitted depending on the situation.

Figure 9:
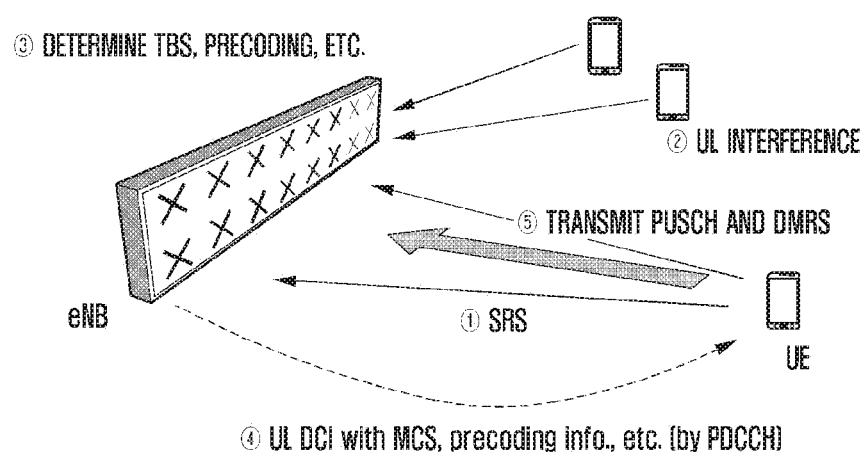
FIG. 9 is a diagram illustrating an uplink transmission procedure for a case where a base station determines all of uplink precoding information.

If the base station configures the first indicator to disable the UL precoding decision capability of the UE (e.g., the first indicator is set to 0), the base station and the UE may perform UL transmission through a procedure as depicted in FIG. 9.

First, the UE transmits an SRS according to the signaling from the base station. The base station performs measurement on the SRS to generate channel information and interference information from other UEs. Afterward, the base station generates UL transmission configuration information such as TBS and TPMI and transmits the UL transmission configuration information to the UE via UL DCI.

If the first indicator is signaled via physical signaling, the base station may estimate the validity of the UE's subband precoding based on the UL channel information and interference information. If it is determined that the UE's subband precoding is invalid, the base station may not allow for the UE to make a subband precoding determination. Afterward, the UE may make a precoding determination to transmit UL data and DMRS based on the received UL DCI, and the base station may receive the UL data and DMRS.

Figure 10:
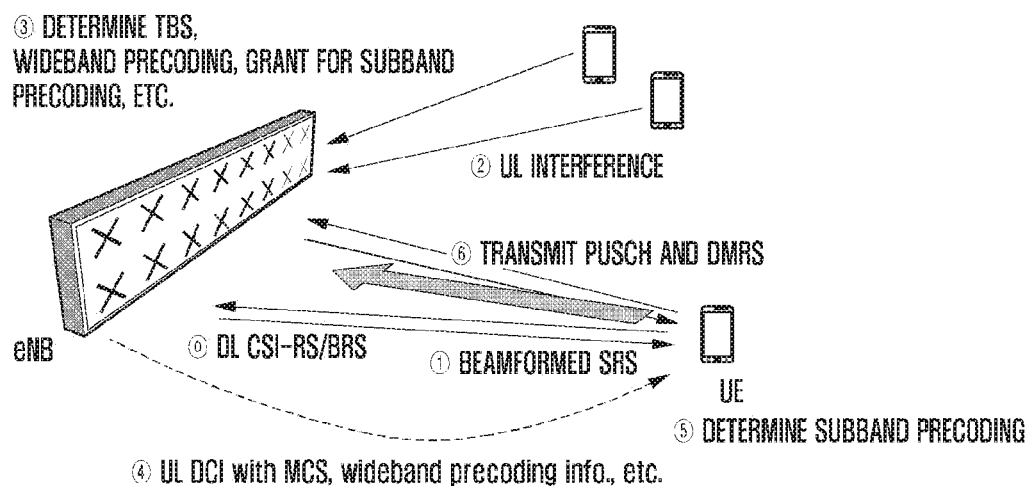
FIG. 10 is a diagram illustrating an uplink transmission procedure for a case where a base station determines part of uplink precoding information.

If the base station configures the first indicator to enable the UE to make a UL precoding determination (e.g., sets the indicator to 1), the base station and the UE perform UL communication as shown in FIG. 10. In this exemplary implementation, the UE may estimate a UL channel based on the DL reference signal (e.g., CSI-RS, beam RS (BRS), and measurement RS (MRS)) and assumption that the UL channel status and DL channel status are correlated.

First, the UE transmits an SRS according to the signaling from the base station. The base station performs measurement on the SRS to generate channel information and interference information from other UEs. Afterward, the base station generates UL transmission configuration information such as TBS and TPMI and transmits the UL transmission configuration information to the UE via UL DCI.

If the first indicator is signaled via physical signaling, the base station may estimate the validity of the UE's subband precoding based on the UL channel information and interference information. If it is determined that the UE's subband precoding is valid, the base station may allow for the UE to make a subband precoding determination. Afterward, the UE may make a wideband precoding determination according to the received UL DCI and a subband precoding determination according to previously estimated UL channel information.

In this case, it may be possible to control such that a subband precoding vector is selected among the vectors included in a beam group indicated by the TPMI conveyed in the UL DCI (per subband) or the vectors included in the signaled beam subset (per subband). The UE may transmit UL data and DMRS based on the determined wideband and subband precoding vector or matrix.

In this embodiment, the subband precoding determination of the UE may be affected by various factors such as TRP (eNB, or base station) and reception scheme of a TRP set and presence/absence of UL transmission UE per TRP.

Figure 11:
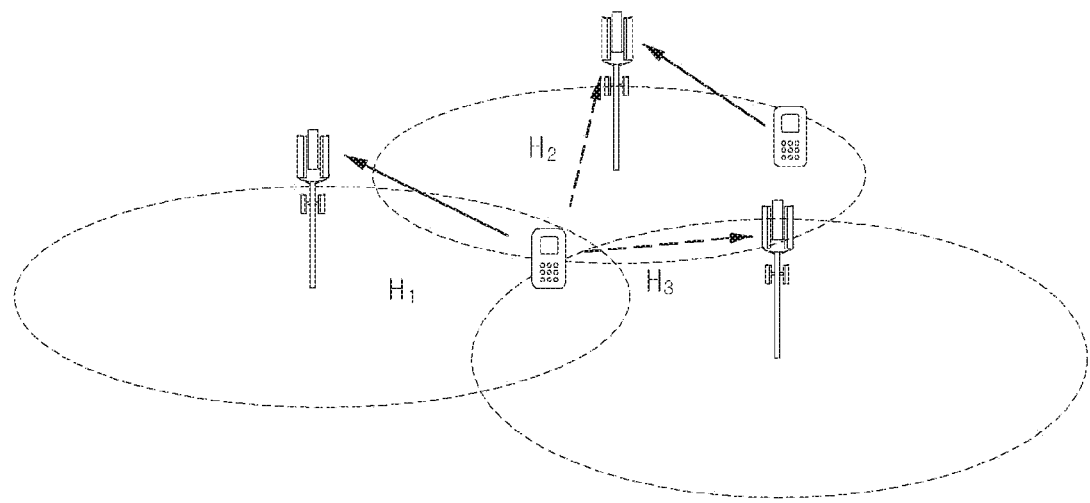
FIG. 11 is a diagram illustrating a situation where a terminal considers second and third channels (or reference signals) as potential interfering links.

FIG. 11 is a diagram illustrating a situation where UL resource utilization (RU) is high such that TRPs serve different UL UEs or coordinated reception of the TRPs is impossible.

Assuming that the desired link of the UE is $H_1$, it is necessary for the UE to maximize the signal on the channel $H_1$ and minimize the signal on interference links $H_2$ and $H_3$. In this case, the UE may calculate $w_{SLNR}$ indicative of a signal-to-leakage-and-noise ratio (SLNR) type UL precoding vector/matrix using Equation 9.

$$w_{SLNR} = \underset{w_i}{\mathrm{argmax}}\ \log_2 \det\left(I + \frac{H_i w_i w_i^H H_i^H}{\sigma_n^2 + \sum_{j \neq i} H_i w_i w_i^H H_i^H}\right) \quad \text{[Equation 9]}$$

Figure 12:
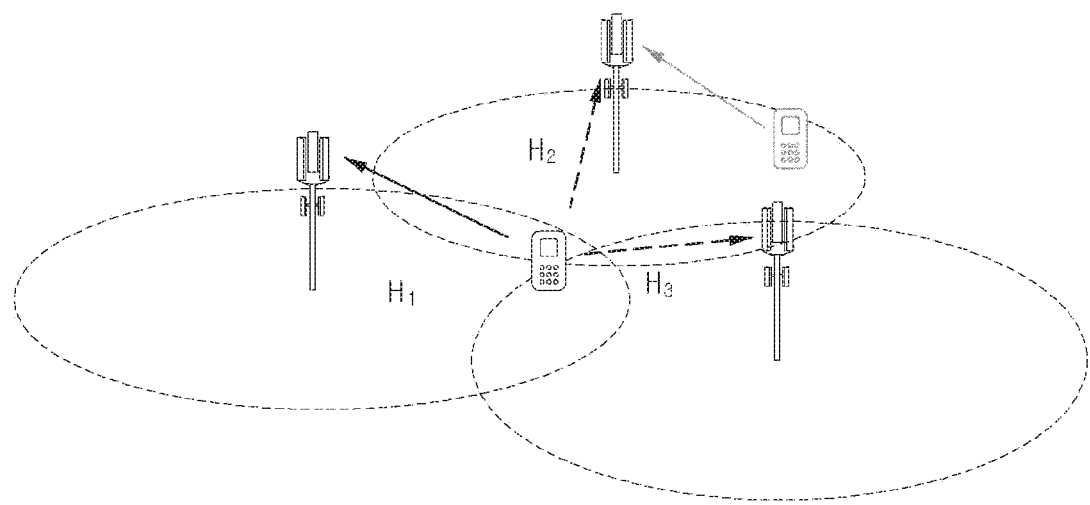
FIG. 12 is a diagram illustrating a situation where a terminal consider second and third channels (or reference signals) as potential desired links.

As another example, FIG. 12 is a diagram illustrating a situation where the UL resource utilization (RU) is low such that neighboring TRPs do not have a UL UE or coordinated reception of the TRPs is possible. In this case, all of the channels, i.e., $H_1$, $H_2$, and $H_3$, are desired links of the terminal such that the UE may maximize the signals being transmitted on all the channels. In this case, the UE may calculate $w_{MF}$ indicative of a matched-filter (MF) type UL precoding vector/matrix using Equation 10.

$$w_{MF} = \underset{w_i}{\mathrm{argmax}}\ \log_2 \det\left(I + \frac{1}{\sigma_n^2}\sum_j H_j w_i w_i^H H_j^H\right) \quad \text{[Equation 10]}$$

Although the description of the precoder calculation of the UE has been made with specific examples for convenience of explanation in the above embodiment, the present invention is not limited thereto and may include other embodiments in which the base station just indicates per-channel interpretation schemes. This may mean that the purposes of the reference signals for estimating respective channels is notified to the UE via physical layer or higher layer signaling.

For example, the respective reference signals may be considered as channel components or interference components depending on a signaling condition. In this approach, the base station, in the situation of FIG. 11, configures the reference signals for measurement of channel $H_1$ as desired links and the reference signals for measurement of channels $H_2$ and $H_3$ as interference links. Similarly, in the situation of FIG. 12, the base station configures the reference signals for measurement of channels $H_1$, $H_2$, and $H_3$ as the desired links.

In this embodiment, it is important for the base station to transmit the information on the reference signals or a number reference signal groups (or number of TRPs or number of cooperative RSs) that should be considered by the UE in addition to the purposes (or reception type of TRP) of the reference signals.

The number of cooperative RSs may be notified from the base station to the UE via physical layer or higher layer signaling, determined by the UE based on the channel information and reported to the base station, or determined implicitly based on the number of transmit antennas of the UE. In the case where the number of cooperative RSs is determined implicitly based on the number of transmit antennas of the UE, if it is configured to consider the reference signals more in number than its transmit antennas, the UE may select a reference signal to be considered in a descending order of received signal strength (RSRP or RSRQ) of the reference signals.

In the first exemplary signaling implementation of this embodiment, it may be assumed that the number of cooperative RSs is signaled via higher layer signal and the purpose of the RS is signaled via physical layer signaling. Such a configuration is made considering that the number of cooperative RSs is semi-static because of a high probability of being determined based on the network topology, while the purpose of the RS may vary dynamically according to presence/absence of any UE having UL transmission to other TRPs.

If 1-bit signaling for the number of cooperative RSs is supported, it may be possible to make a selection as NumberCooperativeRS={2 or 4}. It may be possible to use one of various combinations such as {1, 2} and {1, 3}. In this exemplary implementation, the base station signals only the number and type (or purpose) of RSs that are considered in UL precoding determination, and the RS selection is made by the UE.

Table 2A shows an exemplary implementation for signaling the purpose of RS. According to Table 2A, if the RS type indicator (RTI) or receiver type indicator is set to 00, the UE makes a UL precoding determination without assumption of cooperative reception. Such a determination is made in two ways as follows.

1) The UE makes an uplink precoding determination. This may mean that no subband precoding is performed. In this case, it may not be necessary to transmit a separate signal for allowing the subband precoding. 2) The UE performs UL subband precoding without assumption of TRP cooperative reception. In this case, it is necessary to transmit a signal for allowing subband precoding separately.

As shown in Table 2A, if the RTI is set to 01, the UE recognizes the purpose of RS as Type A. For example, Type A may indicate the RS with the highest received signal strength as the desired link and all other considered RSs as interference links. That is, this may be expressed as assuming an SLNR type of TRP receiver.

Similarly, as shown in Table 2A, if the RTI is set to 10, the UE recognizes the purpose of RS as Type B. For example, Type B may indicate the RS with the highest received signal strength and all other considered RSs as desired links. That is, this may be expressed as assuming an MF type of TRP receiver.

As shown in Table 2A, if the RTI is set to 11, the UE recognizes the purpose of RS as Type C (if Type C exists). If Type C does not exist, RTI=11 may be reserved.

TABLE 2A

RS type indication signaling example

| RS type indicator | UE assumption on uplink precoding calculation |
|---|---|
| 00 | UE shall choose uplink precoder via received precoding information only (or UE shall not assume cooperative TRP receiver) |
| 01 | UE shall assume Type-A RS (TRP receiver) type for precoding decision |
| 10 | UE shall assume Type-B RS (TRP receiver) type for precoding decision |

TABLE 2A-continued

RS type indication signaling example

| RS type indicator | UE assumption on uplink precoding calculation |
|---|---|
| 11 | Reserved (UE shall assume Type-C RS (TRP receiver) type for precoding decision) |

In the second exemplary signaling implementation of this embodiment, it may be assumed that the number of cooperative RSs and the purpose of the RS are encoded together and that the encoded signal is transmitted via physical layer signaling. In this exemplary implementation, it may be possible for the base station to designate an RS set or group for use by the UE. Unlike the first exemplary implementation, the base station selects the RS as well as the number and type (or purpose) of the RSs being considered during the UL precoding determination.

Table 2B shows another exemplary implementation for signaling. Table 2B illustrates the case of using a 3-bit RTI, which may be changed depending on the payload of the RTI. The RTI set 000 in Table 2B is identical in meaning with the RTI set to 00 in Table 2A.

If the RTI is set to 001, 010, or 011, the UE recognizes the RS with the highest received signal strength as the desired link and the RSs with the second, third, and fourth highest received signal strengths as Type-A (interfering) RSs according to the RTI.

Similarly, if the RTI is set to 001, 010, or 011, the UE recognizes the RS with the highest received signal strength and the RSs with the second, third, and fourth highest received signal strengths as Type-B (desired) RS according to the RTI.

TABLE 2B

RS type indication signaling example

| RS type indicator | UE assumption on uplink precoding calculation |
|---|---|
| 000 | UE shall choose uplink precoder via received precoding information only (or UE shall not assume cooperative TRP receiver) |
| 001 | UE shall assume Type-A RS (TRP receiver) type for precoding decision with the best and the second strongest downlink RSs (from different TRPs) |
| 010 | UE shall assume Type-A RS (TRP receiver) type for precoding decision with the best and the third strongest downlink RSs (from different TRPs) |
| 011 | UE shall assume Type-A RS (TRP receiver) type for precoding decision with the best and the forth strongest downlink RSs (from different TRPs) |
| 100 | UE shall assume Type-B RS (TRP receiver) type for precoding decision with the best and the second strongest downlink RSs (from different TRPs) |
| 101 | UE shall assume Type-B RS (TRP receiver) type for precoding decision with the best and the third strongest downlink RSs (from different TRPs) |
| 110 | UE shall assume Type-B RS (TRP receiver) type for precoding decision with the best and the forth strongest downlink RSs (from different TRPs) |
| 111 | Reserved |

In the third exemplary signaling implementation of this embodiment, it may be assumed that a cooperative RS group list is signaled via higher layer signaling and the purpose of RS is signaled via physical layer signaling. In this exemplary implementation, the number of cooperative RSs is implicitly determined according to the number of RSs (TRPs) included in the cooperative RS group.

In this exemplary implementation, it may be possible to configure a group list including one or more cooperative RS groups via higher layer signaling. For example, it may be possible to generate 3 cooperative RS group lists with RS IDs (or TRP IDs) as follows.

Set #0={RS ID # A, RS ID # B, RS ID # C}
Set #1={RS ID # A}
Set #2={RS ID # B, RS ID # D}

In this exemplary implementation, it may be possible to signal an RS type indicator that can be set as illustrated in Table 2C based on the aforementioned cooperative RS group list. Table 2C exemplifies the case of using a 2-bit RTI, which may be changed according to the payload of the RTI. The RTI set to 00 in Table 2C is identical in meaning with the RTI set to 00 in Table 2A.

As shown in FIG. 2C, if the RTI is set to 01, 10, or 11, the UE determines the purposes of the respective RSs by referencing the signaled cooperative RS group list to make a UL precoding determination. Although only the Type-A RS is assumed in Table 2C, it is obvious that any modification can be made appropriately depending on the situation.

TABLE 2C

RS type indication signaling example

| RS type indicator | UE assumption on uplink precoding calculation |
|---|---|
| 00 | UE shall choose uplink precoder via received precoding information only (or UE shall not assume cooperative TRP receiver) |
| 01 | UE shall assume Type-A RS (TRP receiver) type for precoding decision with the first set of downlink RS resource configurations (TRPs) configured by higher layer |
| 10 | UE shall assume Type-A RS (TRP receiver) type for precoding decision with the second set of downlink RS resource configurations (TRPs) configured by higher layer |
| 11 | UE shall assume Type-A RS (TRP receiver) type for precoding decision with the third set of downlink RS resource configurations (TRPs) configured by higher layer |

In the fourth exemplary signaling implementation of this embodiment, it may be assumed that a list and purpose of cooperative RSs (or TRPs) are signaled via higher layer signaling and that other detailed configurations are signaled via physical layer signaling. In this exemplary implementation, the base station may explicitly notify the UE of the RS candidates to be considered via higher layer signaling. It may also be possible to notify the purposes (desired link or interfering link) of the respective RSs using a bitmap being transmitted via higher layer signaling.

In this case, the respective bits of the bitmap indicate the purposes of the corresponding RSs by referencing the order of RS IDs in the cooperative RS list. For example, assuming the RS ID list of {RS ID # A, RS ID #8, RS ID # C} and the bitmap of {1 0 1}, the RS ID # A indicates that the corresponding RS is of a desired link, the RS ID # B indicates that the corresponding RS is of an interfering link, and the RS ID # C indicates that the corresponding RS is of a desired link. Here, it is assumed that a prior agreement has been made to set each bit of the bitmap to 1 for indicating the corresponding RS as a desired link and 0 for indicating the corresponding RS as an interfering link.

On the basis of higher layer signaling, it is possible for the base station to notify the UE of the number of cooperative RSs, subgroup indices of the cooperative RSs, and RS type selection indicator via physical layer signaling. In particular, it may be possible to make an agreement for considering the RSs of which corresponding bits are set to 0 in the bitmap when the RS type selection indicator is set to 0 and the RSs of which corresponding bits are set to 1 in the bitmap when the RS type selection indicator is set to 1.

Embodiment 2

In embodiment 2, it may be possible for the base station to adjust the hierarchical structure of a control channel such as UL-related DCI to transmit a large volume of UL control information to a UE depending on a situation. For example, a one-step UL-related DCI may be sufficient to transmit the control information for UL transmission in a specific situation where the UE has a small number of transmit antennas or has only wideband precoding capability and thus the UL TPMI information amount is small.

Meanwhile, if the UE has a large number of transmit antennas and supports subband precoding, it may become necessary to transmit a large payload of UL TPMI information as described above; in this case, it may be possible to protect against coverage issue problems caused by an increase of the size of a control channel by introducing two-step control signaling.

In order to support the aforementioned variable hierarchical structure of control channels (or two-step DCI), it may be possible to employ hierarchical information signaling with one or more bits.

For example, in the case where higher layer information is transmitted via physical layer signaling, the UE may assume that there is a control channel of at least one layer. As a more detailed example, the control channel of the at least one layer may be defined as DCI. In this exemplary implementation, assuming 1-bit layer information signaling, it may be possible for the UE to determine whether to transmit a control channel or control information on an additional layer based on the corresponding signaling.

For example, if the layer information signaling is turned off (or the layer information signaling is set to a first value, e.g., 0), the UE may perceive that the DCI is a sole layer. If the layer information signaling is turned on (or the layer information signaling is set to a second value, e.g., 1), the UE may perceive that the control information is transmitted on an additional layer in addition to the DCI.

Here, if the layer information signaling is set to 1, it may be possible to use part of the DCI (e.g., TPMI) as an indicator indicating frequency-time resources allocated for the control information being transmitted on the additional layer. It is not necessary that the frequency-time resources for transmitting the additional layer control information are separate control resources, e.g., NR PDCCH, and the control information may be transmitted on part of data resources, e.g., NR PDSCH.

According to the above exemplary implementation, if the additional layer control information is transmitted on part of the data resources (e.g., NR PDSCH), the UE may ascertain the resource location in the time and frequency domains based on part of the DCI (e.g., TPMI). The UE cannot ascertain the information on other information necessary for receiving designated downlink data (NR PDSCH) such as an MCS, transmission scheme, spatial layer, and number of codewords. In order to solve this problem, it may be possible to make a prior agreement for a UE predetermined MCS, transmission scheme, spatial layer, and number of codewords for transmitting additional layer control information on the data channel.

As described above, it may be possible to predict that the TPMI payload for UL subband precoding has a length of a few dozen to a few hundreds of bits, which is very short in comparison with data payload. The UL TPMI as part of control information has to have high reliability. Accordingly, it may be possible to transmit the predetermined values with a signal codeword on a single spatial layer in a transmit diversity scheme at a low MCS level, e.g., QPSK and 1/3 coding rate. Although the description has been made by way of examples, the values may be changed appropriately depending on the situation when applying in reality.

In the above exemplary implementation, the TPMI has 1) the meaning of the original TPMI or 2) the meaning as an indicator indicating the resources for low layer control information transmission according the layer information signaling. However, it is not necessary to be limited thereto, and it is obvious that the TPMI of the control information (DCI) of the first layer can be perceived as a wideband TPMI and used as an indicator indicating the resources for transmitting low layer control information when applying in reality.

If the purpose of the TPMI of the first layer (DCI) is changed according to the higher layer information signaling, the low layer control information may include both the wideband TPMI (or beam group information) and the subband TPMI (or beam information). If the purpose of the control information of the first layer (DCI) with the exception of the TPMI is changed according to the higher layer, the low layer control information may include only the subband TPMI (or beam information) and not the wideband TPMI (or beam group information).

Although it is assumed that 1-bit layer information signaling is used for indicating the 2-step control signaling structure in the above exemplary implementation, it is obvious that multi-bit layer information signaling can be used when applying in reality. Detailed descriptions thereof are nothing but an expansion of the explanation and thus are omitted.

Figure 13:
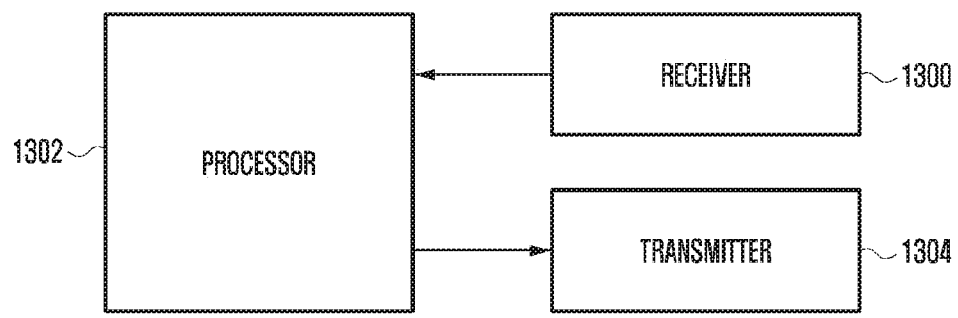
FIG. 13 is a block diagram illustrating a configuration of a UE according to an embodiment of the present invention.
Figure 14:
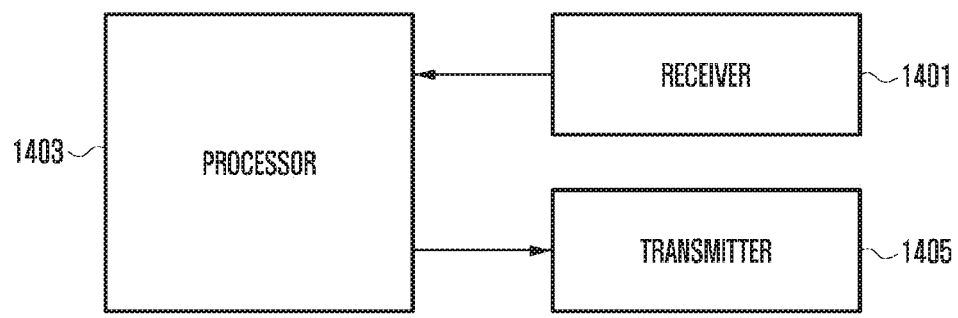
FIG. 14 is a block diagram illustrating a configuration of a base station according to an embodiment of the present invention.

The UE and base station composed, each, of a transmitter, a receiver, and a processor for implementing the methods of the above embodiments are depicted in FIGS. 13 and 14, respectively. In order to implement the method for performing subband precoding in embodiments 1 and 2, the transmitter, receiver, and processor of each of the base station and the UE should operate as described in the respective embodiments.

FIG. 13 is a block diagram illustrating a configuration of a UE according to an embodiment of the present invention. As shown in FIG. 13, the UE may include a processor 1302, a receiver 1300, and a transmitter 1304. According to an embodiment of the present invention, the receiver 1300 and the transmitter 1304 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal.

The transceiver may output the signal received over a radio channel to the processor 1302 and transmit the signal output from the processor 1302 over the radio channel. According to an embodiment of the present invention, the processor 1302 may control overall operations of the UE. For example, the processor 1302 may control the receiver 1300 to receive a signal conveying subband precoding information from the base station and interpret the subband precoding information. The transmitter 1304 transmits a UL signal according to the above information.

FIG. 14 is a block diagram illustrating a configuration of a base station according to an embodiment of the present invention. As shown in FIG. 14, the base station may include a processor 1403, a receiver 1401, and a transmitter 1405. According to an embodiment of the present invention, the receiver 1401 and the transmitter 1405 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal.

The transceiver may output the signal received over a radio channel to the processor 1403 and transmit the signal output from the processor 1403 over the radio channel. According to an embodiment of the present invention, the processor 1403 may control overall operations of the base station. For example, the processor 1403 may determine a subband precoding scheme of the UE and control to generate subband precoding information to the UE. The transmitter 1405 transmits the subband precoding information to the UE, and the receiver 1401 receives the UL signal to which the subband precoding is applied.

According to an embodiment of the present invention, the processor 1403 may control to generate downlink control information (DCI) including the reference signal processing information for UL precoding.

The embodiments disclosed in the specification and drawings are proposed to help explain and understand the present invention rather than to limit the scope of the present invention. It is obvious to those skilled in the art that modifications and changes can be made thereto without departing from the spirit and scope of the present invention. If necessary, the embodiments may be combined in whole or in part. For example the base station and the UE may operate according to a combination of parts of embodiments 1 and 2 of the present invention. Although the embodiments been directed to the FDD LTE system, the present invention can include alternative embodiments directed to other systems such as TDD LTE and 5G NR systems without departing from the technical sprit of the present invention.

The invention claimed is:

1. A method by a terminal in a wireless communication system, the method comprising:
    receiving, from a base station, precoding-related information for the terminal, wherein the precoding-related information comprises information indicating whether an uplink subband precoding is applicable;
    identifying whether the uplink subband precoding is applicable based on the precoding-related information; and
    performing uplink data transmission using specific subband precoding information for each subband, according to the uplink subband precoding being identified to be applicable.

2. The method of claim 1, wherein the precoding-related information comprises wideband precoding information being applied for the uplink transmission of the terminal.

3. The method of claim 1, further comprising:
    obtaining reference signal-related information for configuring the uplink subband precoding,
    wherein the specific subband precoding information is determined based on the reference signal-related information.

4. The method of claim 3, wherein the reference signal-related information comprises at least one of reception type information of the base station, a number of reference signal groups according to the reception type of the base station, and link type information according to a received signal strength of the reference signal.

5. The method of claim 3, wherein the precoding-related information is transmitted by physical layer signaling, and the reference signal-related information is transmitted by at least one of higher layer signaling and physical layer signaling.

6. A method by a base station in a wireless communication system, the method comprising:
identifying whether to allow an uplink subband precoding of a terminal based on a channel status of the terminal;
transmitting, to the terminal, precoding-related information including a result of the identification, wherein the precoding-related information comprises information indicating whether an uplink subband precoding is applicable; and
receiving, from the terminal, uplink data based on the transmission of the precoding-related information,
wherein the uplink data is received based on specific subband precoding information for each subband.

7. The method of claim 6, wherein the precoding-related information comprises wideband precoding information being applied for the uplink transmission.

8. The method of claim 6, further comprising:
transmitting, based on the uplink subband precoding being allowed for the terminal, reference signal-related information for subband precoding configuration,
wherein the reference signal-related information is used for determining the specific subband precoding information to be applied to the uplink subband precoding of the terminal.

9. The method of claim 8, wherein the reference signal-related information comprises at least one of reception type information of the base station, a number of reference signal groups according to the reception type of the base station, and link type information according to a received signal strength of the reference signal.

10. The method of claim 8, wherein the precoding-related information is transmitted by physical layer signaling, and the reference signal-related information is transmitted by at least one of higher layer signaling and physical layer signaling.

11. A terminal in a wireless communication system, the terminal comprising:
a transceiver; and
a controller coupled with the transceiver and configured to:
receive, from a base station via the transceiver, precoding-related information for the terminal, wherein the precoding-related information comprises information indicating whether an uplink subband precoding is applicable;
identify whether the uplink subband precoding is applicable based on the precoding-related information; and
perform uplink data transmission using specific subband precoding information for each subband, according to the uplink subband precoding being identified to be applicable.

12. The terminal of claim 11, wherein the precoding-related information comprises wideband precoding information being applied for the uplink transmission of the terminal.

13. The terminal of claim 11,
wherein the controller is further configured to control the transceiver to obtain reference signal-related information for configuring the uplink subband precoding,
wherein the specific subband precoding information is determined based on the reference signal-related information, and
wherein the reference signal-related information comprises at least one of reception type information of the base station, a number of reference signal groups according to the reception type of the base station, and link type information according to a received signal strength of the reference signal.

14. A base station in a wireless communication system, the base station comprising:
a transceiver; and
a controller coupled with the transceiver and configured to:
identify whether to allow an uplink subband precoding of a terminal based on a channel status of the terminal;
transmit, to the terminal via the transceiver, precoding-related information including a result of the identification, wherein the precoding-related information comprises information indicating whether an uplink subband precoding is applicable; and
receive, from the terminal, uplink data based on the transmission of the precoding-related information,
wherein the uplink data is received based on specific subband precoding information for each subband.

15. The base station of claim 14, wherein the precoding-related information comprises wideband precoding information being applied for the uplink transmission.

16. The base station of claim 14, wherein the controller is further configured to transmit, based on the uplink subband precoding being allowed for the terminal, reference signal-related information for subband precoding configuration,
wherein the reference signal-related information is used for determining the specific subband precoding information to be applied to the uplink subband precoding of the terminal, and
wherein the reference signal-related information comprises at least one of reception type information of the base station, a number of reference signal groups according to the reception type of the base station, and link type information according to a received signal strength of the reference signal.

* * * * *